(12) United States Patent
Date et al.

(10) Patent No.: US 7,066,149 B1
(45) Date of Patent: Jun. 27, 2006

(54) INTERNAL COMBUSTION ENGINE FUEL PRESSURE CONTROL APPARATUS

(75) Inventors: Toshiaki Date, Tokyo (JP); Takahiko Oono, Hyogo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/211,634

(22) Filed: Aug. 26, 2005

(30) Foreign Application Priority Data

Jan. 24, 2005 (JP) .......................... P2005-015580

(51) Int. Cl.
*F02M 37/04* (2006.01)
*F02M 37/00* (2006.01)

(52) U.S. Cl. .................. 123/457; 123/456; 123/447
(58) Field of Classification Search ................ 123/456, 123/457, 447, 458, 511, 446, 459, 463
See application file for complete search history.

(56) References Cited

U.S. PATENT DOCUMENTS

| | | | |
|---|---|---|---|
| 3,817,231 A * | 6/1974 | O'Neill | 123/445 |
| 6,394,072 B1 * | 5/2002 | Yoshida et al. | 123/506 |
| 6,868,826 B1 * | 3/2005 | Oono | 123/339.1 |
| 6,871,633 B1 * | 3/2005 | Date et al. | 123/447 |
| 6,889,666 B1 * | 5/2005 | Oono | 123/514 |
| 6,918,376 B1 * | 7/2005 | Oono et al. | 123/458 |
| 6,953,025 B1 * | 10/2005 | Takahashi | 123/497 |
| 2005/0126539 A1 * | 6/2005 | Okamoto | 123/446 |

FOREIGN PATENT DOCUMENTS

| | | |
|---|---|---|
| JP | 04-334740 A | 11/1992 |
| JP | 04-365956 A | 12/1992 |
| JP | 08-232703 A | 9/1996 |

* cited by examiner

*Primary Examiner*—Mahmoud Gimie
(74) *Attorney, Agent, or Firm*—Sughrue Mion, PLLC (57) ABSTRACT

An internal combustion engine fuel pressure control apparatus includes: fuel pressure control means including a spill valve and a high-pressure fuel pump that pressure-feeds fuel to an accumulation chamber; and control means that calculates a control quantity of the fuel pressure control means on the basis of pressure information of fuel supplied to an injector and variably sets the pressure of the fuel supplied to the injector, wherein the control quantity calculated by the control means is configured by a first feedback quantity that feeds back the fuel quantity that the high-pressure fuel pump pressure-feeds to the accumulation chamber and a second feedback quantity that feeds back the timing at which the spill valve opens or closes a fuel relief path.

8 Claims, 10 Drawing Sheets

INTERNAL COMBUSTION ENGINE FUEL PRESSURE CONTROL APPARATUS

BACKGROUND OF THE INVENTION

1. Field of the Invention

The present invention relates to an internal combustion engine fuel pressure control apparatus, and in particular to an internal combustion engine fuel pressure control apparatus suited for controlling the pressure of fuel supplied to a fuel injection valve in a cylinder fuel injection type internal combustion engine.

2. Description of the Related Art

In cylinder fuel injection type internal combustion engines, an accumulator fuel injection control apparatus is usually used. Namely, the accumulator fuel injection control apparatus comprises: an accumulation chamber that accumulates fuel in a high-pressure state; a high-pressure fuel pump that sucks in fuel and discharges the fuel to the accumulation chamber; an injector that injects/supplies the high-pressure fuel accumulated in the accumulation chamber to cylinders of the internal combustion engine; and control means that controls the injection period and injection quantity of the fuel and the discharge quantity of the high-pressure fuel pump. The high-pressure fuel pump comprises: a cylinder; a pump piston that is driven by a pump drive-use cam disposed on a rotating shaft (e.g., a cam shaft) of the internal combustion engine, pumps inside the cylinder, sucks fuel into a booster chamber during the suction process and discharges the fuel inside the booster chamber to the accumulation chamber during the discharge process by a reciprocating motion in the cylinder and a spill valve that relieves the fuel boosted inside the booster chamber to a low pressure at a predetermined timing to control the discharge quantity from the booster chamber to the accumulation chamber and control the fuel pressure of the accumulation chamber to a predetermined pressure.

The fuel discharge quantity from the booster chamber to the accumulation chamber is determined by the feedforward quantity corresponding to the same quantity of fuel as the fuel supply from the injector to the cylinders and the feedback quantity calculated by known PID control that conducts a proportional, integral and differential operation on the basis of the deviation between the target value and the actual measured value, and the timing for driving the spill valve is determined on the basis of the determined fuel discharge quantity and the running condition (e.g., see Japanese Patent No. 2,890,898).

In such an accumulator fuel injection control apparatus, there is the problem that the fuel injection quantity fluctuates due to changes over time in the discharge efficiency of the fuel pump, differences in the airframe of the fuel pump, or differences in the capacity of the fuel pipe system. With respect to this problem, Japanese Patent No. 3,136,938 discloses taking the following countermeasure.

Namely, in a known fuel pressure control apparatus that conducts a proportional, integral, and differential (PID) operation on the difference between the target fuel pressure and the measured fuel pressure to control the discharge quantity of the fuel pump, learning means is disposed which, when the integral term of the PID operation deviates from a predetermined range, executes learning that changes the proportionality constant used in the PID operation and adjusts the integral term to fall within the predetermined range.

Also, in a known fuel pressure control apparatus that conducts a feedforward operation so as to maintain the fuel pressure at a target fuel pressure by supplying, to a fuel accumulation chamber and with a fuel pump, the same quantity of fuel as the fuel quantity supplied from the fuel injection valve to the cylinders, control quantity determining means is disposed which multiplies a correction coefficient with the fuel quantity to be supplied to the fuel accumulation chamber to determine the fuel quantity that the fuel pump is to discharge, and which conducts integral correction to determine a control quantity for controlling the discharge quantity of the fuel pump, and learning means is disposed which, when the integral correction fuel quantity deviates from a predetermined range, executes learning that changes the correction coefficient and adjusts the integral term to fall within the predetermined range.

As described above, because it is necessary to control the spill valve at a predetermined timing in response to the life of the pump drive-use cam, the spill valve is controlled using a rotary signal to indicate the position of the pump drive-use cam. As disclosed in Japanese Patent No. 2836282, for example, there are apparatus that use the signal of a crank angle rotary sensor as the rotary signal. In this case, because the installation error between the pump drive-use cam and the crankshaft becomes a problem, the installation error is compensated by the phase difference between the signal of the cam angle rotary sensor to which the pump drive-use cam is attached and the signal of the crank angle rotary sensor.

However, it is difficult for the fuel pressure control apparatus disclosed in Japanese Patent No. 3,136,938 to accurately compensate both fluctuations in the fuel injection quantity resulting from changes over time in the discharge quantity of the fuel pump, differences in the airframe of the fuel pump, or differences in the capacity of the fuel pipe system, i.e., fluctuations and variations stemming from the discharge quantity of the fuel pump, and fluctuations and variations that affect the drive timing of the spill valve, such as the output tolerance of the cam angle rotary sensor, the manufacturing tolerance of the plate engine, and the installation error between the fuel pump and the pump drive cam with respect to the rotary signal.

Figure 11:
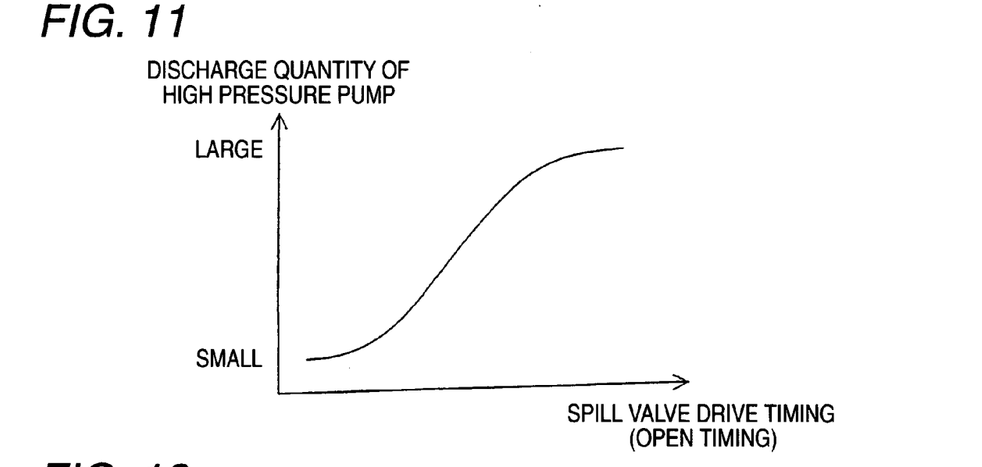
FIG. 11 is a diagram showing the relationship between a spill valve drive timing and the high-pressure pump discharge quantity according to the second embodiment of the invention.

More specifically, the fuel pressure control apparatus disclosed in Japanese Patent No. 3,136,938 executes learning which changes the proportionality constant used in the PID operation when the integral term of the PID operation deviates from the predetermined range, and the operational quantity is one of either the discharge quantity or the drive timing. Namely, to describe a specific example assuming that the operational quantity of the fuel pressure control apparatus disclosed in Japanese Patent No. 3,136,938 is the drive timing, fluctuations and variations that affect the drive timing of the spill valve are corrected by an integral term within the predetermined range, and fluctuations and variations stemming from the discharge quantity of the fuel pump are corrected by learning that changes the proportionality constant. However, because the operational quantity that is the result of the PID operation is the drive timing of the spill valve, when the running point has changed from the point where learning that changes the proportionality constant was conducted, it is difficult to accurately compensate fluctuations and variations stemming from the discharge quantity of the fuel pump. As shown in FIG. 11, for example, this is because the discharge quantity and the drive timing usually have a nonlinear relationship.

In the system disclosed in Japanese Patent No. 2,836,282, the phase difference between the signal of the cam angle rotary sensor and the signal of the crank angle rotary sensor is simply detected. Thus, the installation error between the pump drive-use cam and the crankshaft can be compensated, but the installation error between the fuel pump and the pump drive cam with respect to the rotary sensor cannot be corrected, and there is the concern of error arising in the discharge fuel quantity.

When error arises in the discharge fuel quantity, the fuel pressure inside the accumulation chamber is no longer controlled to the predetermined pressure. Thus, there is the potential for the fuel injected from the fuel injection valve to depart from the optimum condition and for the intended air-fuel mixture to not be obtainable. As a result, the combustion of the internal combustion engine deteriorates, and there is the concern of the runability and exhaust gas of the automobile to deteriorate.

SUMMARY OF THE INVENTION

The present invention has been made in view of these problems in the conventional apparatus, and it is an object thereof to obtain an internal combustion engine fuel pressure control apparatus that accurately compensates by learning fluctuations and variations that affect the drive timing of the spill valve, such as the output tolerance of the cam angle rotary sensor, the manufacturing tolerance of the plate engine, and the installation error between the fuel pump and the pump drive cam with respect to the rotary signal, and which precisely controls the spill valve and reduces the error of the discharge fuel quantity by also controlling fluctuations and variations stemming from the discharge quantity of the fuel pump such as fluctuations in the fuel injection quantity due to changes over time in the discharge efficiency of the fuel pump, differences in the airframe of the fuel pump, or differences in the capacity of the fuel pipe system.

The internal combustion engine fuel pressure control apparatus comprises: an accumulation chamber that accumulates fuel at a high pressure; fuel pressure control means including a high-pressure fuel pump that intakes fuel and pressure-feeds the fuel to the accumulation chamber and a spill valve that opens/closes a fuel relief path that communicates a booster chamber of the high-pressure fuel pump and a low pressure side; an injector that injects/supplies the high-pressure fuel accumulated in the accumulation chamber to cylinders of the internal combustion engine; a fuel pressure sensor that detects, as fuel pressure, the pressure of the fuel supplied to the injector; and control means that calculates a control quantity of the fuel pressure control means on the basis of fuel pressure information detected by the fuel pressure sensor and which variably sets the pressure of the fuel supplied to the injector by driving/controlling the fuel pressure control means, wherein the control quantity calculated by the control means is configured by a first feedback quantity that feeds back the fuel quantity that the high-pressure fuel pump pressure-feeds to the accumulation chamber and a second feedback quantity that feeds back the timing at which the spill valve opens or closes the fuel relief path.

According to the present invention, fluctuations and variations stemming from the discharge quantity of the high-pressure fuel pump can be suppressed, fluctuations and variations affecting the timing at which the spill valve opens or closes the fuel relief path can also be suppressed, and the fuel pressure inside the accumulation chamber can be accurately controlled to a predetermined pressure.

DETAILED DESCRIPTION OF THE INVENTION

FIRST EMBODIMENT

A first embodiment of the invention will be described in detail below on the basis of the drawings.

Figure 1:
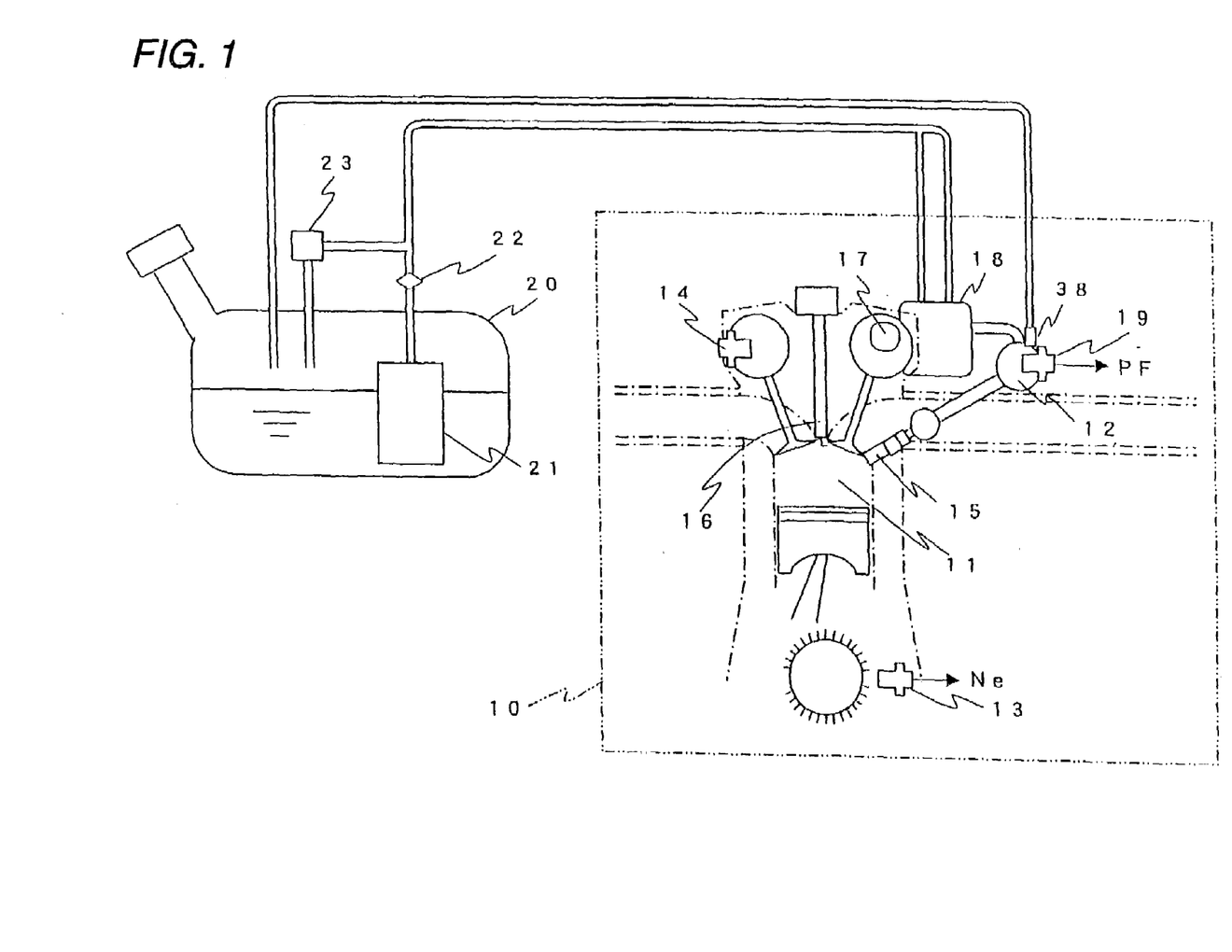
FIG. 1 is a configural diagram schematically showing a fuel pressure control apparatus of a cylinder fuel injection type internal combustion engine according to a first embodiment of the invention.

FIG. 1 is a configural diagram schematically showing a fuel pressure control apparatus of a cylinder fuel injection type internal combustion engine according to the first embodiment of the invention, and shows a case where the fuel pressure control apparatus is configured by a control apparatus of an internal combustion engine installed in an automobile, for example.

Figure 2:
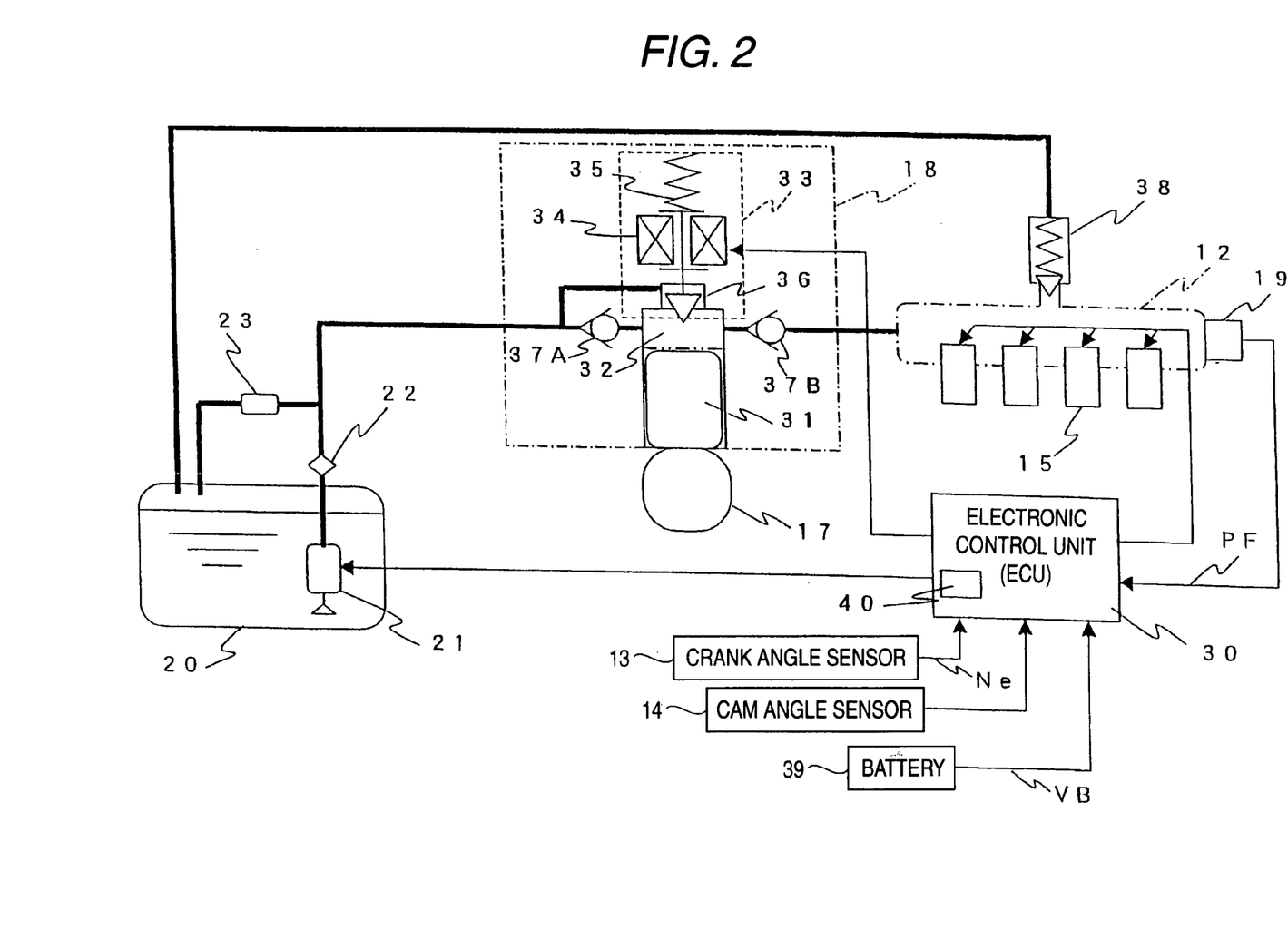
FIG. 2 is a block diagram showing a fuel system of the fuel pressure control apparatus of the cylinder fuel injection type internal combustion engine according to the first embodiment of the invention.

FIG. 2 is a block diagram showing a fuel system of the fuel pressure control apparatus of the cylinder fuel injection type internal combustion engine according to the first embodiment of the invention.

In FIG. 1, an engine 10 configuring the cylinder fuel injection type internal combustion engine includes plural cylinders and is configured so that high-pressure fuel is directly injected ins idea combustion chamber 11 of the cylinders via an accumulation chamber (also called a "fuel rail" below) 12. Here, in order to avoid complexity of depiction, the diagrams show a configuration in relation to only one representative cylinder.

A crank angle sensor 13 is disposed in a crankshaft of the engine 10, and a cam angle sensor 14 is disposed in a cam shaft.

The crank angle sensor 13 outputs a pulse signal corresponding to the rotational speed Ne of the engine 10.

An injector 15 for directly injecting fuel and a spark plug 16 that generates a spark for combusting the fuel are disposed inside the combustion chamber 11 of each cylinder.

A pump cam 17 that rotates integrally with the cam shaft is disposed in a cam shaft for an exhaust valve (or intake valve) of the engine 10.

Fuel pressure control means 18 disposed in relation to the pump cam 17 is disposed with a high-pressure fuel pump whose output port is communicated with the fuel rail 12, and the fuel pressure control means 18 is driven so that the fuel pressure PF inside the fuel rail 12 matches a target fuel pressure PFo (the details of which will be described later).

Here, the fuel pressure PF inside the fuel rail 12 is averaged or filtered by an electronic control unit (abbreviated below as "ECU") 30.

The target fuel pressure PFo variably set on the basis of the rotational speed Ne or load information of the engine 10, for example.

A fuel pressure sensor 19 for outputting the fuel pressure PF inside the fuel rail 12 as feedback information is disposed in the fuel rail 12.

A fuel tank 20 is communicated with an input port of the fuel pressure control means 18.

A feed pump 21 for pumping the fuel is disposed inside the fuel tank 20. A filter 22 for purifying the fuel and a regulator 23 for regulating the pressure of the fuel supplied to the fuel pressure control means 18 are disposed at the output side of the feed pump 21.

In FIG. 2, a specific example of the fuel pressure control means 18 and the fuel rail 12 is shown in relation to the fuel system from the fuel tank 20.

The injector 15, the fuel pressure control means 18, and the feed pump 21 inside the fuel tank 20 are driven/controlled by the ECU 30.

In FIG. 2, the ECU 30 detects the engine rotational speed Ne on the basis of the output information from the crank angle sensor 13 and discriminates the cylinders on the basis of the output information from the cam angle sensor 14.

The ECU 30 calculates the fuel injection and ignition timing of the cylinders and drives/controls various kinds of actuators. The ECU 30 also feedback-controls the fuel pressure PF inside the fuel rail 12 to a target fuel pressure on the basis of the output information (fuel pressure PF) from the fuel pressure sensor 19.

The fuel pressure control means 18 is disposed with a piston 31 that is moved up and down by the pump cam 17, a booster chamber 32 that moves in association with the piston 13, and a spill valve 33 that regulates the quantity of fuel fed to the fuel rail 12.

The spill valve 33 is configured by a coil 34, a valve plug 36 that is disposed at the lower end portion of the coil 34 and moves up and down when the coil 34 is energized, and a spring 35 that urges the valve plug 36 downward.

A check valve 37A and a check valve 37B are respectively inserted into the input port side of the booster chamber 32 and the output port side of the booster chamber 32 leading to the fuel rail 12.

A relief valve 38 is disposed in the fuel rail 12. The relief valve 38 is configured to open when the fuel pressure PF inside the fuel rail 12 reaches the open valve pressure of the relief valve 38 and to return the fuel inside the fuel rail 12 to the fuel tank 20.

In FIGS. 1 and 2, the ECU 30 sets the target fuel pressure PFo on the basis of the engine rotational speed Ne and load information, drive/controls the fuel pressure control means 18, and conducts control so that the fuel pressure PF inside the fuel rail 12 becomes the target fuel pressure PFo.

The ECU 30 also separately controls the injector 15 and spark plug 16 per cylinder, and controls the fuel injection and ignition timing of each cylinder. At this time, each injector 15 and each spark plug 16 are driven by an injector drive signal and an ignition signal outputted from the ECU 30.

Next, the ordinary fuel pressure feedback control operation (the operation of setting the pressure of the fuel supplied to the injector 15) resulting from the ECU 30 and the fuel pressure control means 18 will be described with reference to FIGS. 1 and 2.

First, the fuel pumped from the inside of the fuel tank 20 by the feed pump 21 is passed through the filter 22, the fuel pressure is regulated by the regulator 23, and the fuel is introduced to the fuel pressure control means 18.

The piston 31 inside the fuel pressure control means 18 is move up and down by the pump cam 17 rotating integrally with the cam shaft. Thus, the capacity of the booster chamber 32 changes, and the fuel compressed by the booster chamber 32 is introduced to the fuel rail 12 via the check valve 37B (i.e., the fuel is pressure-fed to the fuel rail by the high-pressure fuel pump).

However, the quantity of fuel pressure-fed to the fuel rail 12 during the fuel discharge period is regulated by controlling the open/close period of the valve plug 36 (below, referred to simply as "the spill valve 33") of the spill valve 33.

The valve plug 36 inside the spill valve 33 is moved upward by an energization signal from the ECU 30 to the coil 34, overcomes the urging force of the spring 35, and opens the path of the lower end portion associated with the booster chamber 32. When the valve plug 36 moves upward and the path is opened, the booster chamber 32 is communicated with the intake port side and the fuel inside the booster chamber 32 returns to the intake port side. Thus, the fuel is no longer sent to the fuel rail 12. Therefore, the fuel is not discharged from the fuel pressure control means 18 (high-pressure fuel pump) to the fuel rail 12.

When the energization of the coil 34 is cut off, the valve plug 36 moves downward and closes off the path by the biasing power of the spring 35. Thus, high-pressure fuel is discharged from the fuel pressure control means 18 to the fuel rail 12. At this time, when the fuel pressure PF reaches the open valve pressure, the relief valve 38 opens and returns the fuel inside the fuel rail 12 to the fuel tank 20.

Here, the timing at which the spill valve 33 opens and closes is set as an angle from a reference signal (e.g., a reference signal corresponding to the bottom dead center of the piston 31 inside the fuel pressure control means 18) of the cam angle sensor (or the crank angle sensor).

The fuel pressure sensor 19 detects the fuel pressure PF inside the fuel 12, transmits the detected fuel pressure PF to the ECU 30, and contributes to the fuel pressure feedback control by the ECU 30.

The high-pressure fuel inside the fuel rail 12 whose fuel pressure is controlled in this manner is directly injected from the injector 15 to the inside of the combustion chamber 11.

The above fuel pressure control represents an example of a processing operation (low-pressure spill variable fuel pressure control) that regulates the fuel pressure feed quantity to the fuel rail 12 so that the fuel pressure PF becomes the target fuel pressure PFo.

In the first embodiment of the invention, a method where the spill valve 33 is opened during the first half of the fuel discharge period and high-pressure fuel is discharged from the fuel pressure control means 18 to the fuel rail 12 (first half discharge, latter half relief), or a method where the spill valve 33 is closed during the latter half of the fuel discharge period and high-pressure fuel is discharged from the fuel pressure control means 18 to the fuel rail 12 (first half relief, latter half discharge), may also be applied.

Next, the configuration of the fuel pressure feedback control of the invention resulting from the ECU 30 and the fuel pressure control means 18, which are control means, will be described with reference to the control block diagram of FIG. 3.

Figure 3:
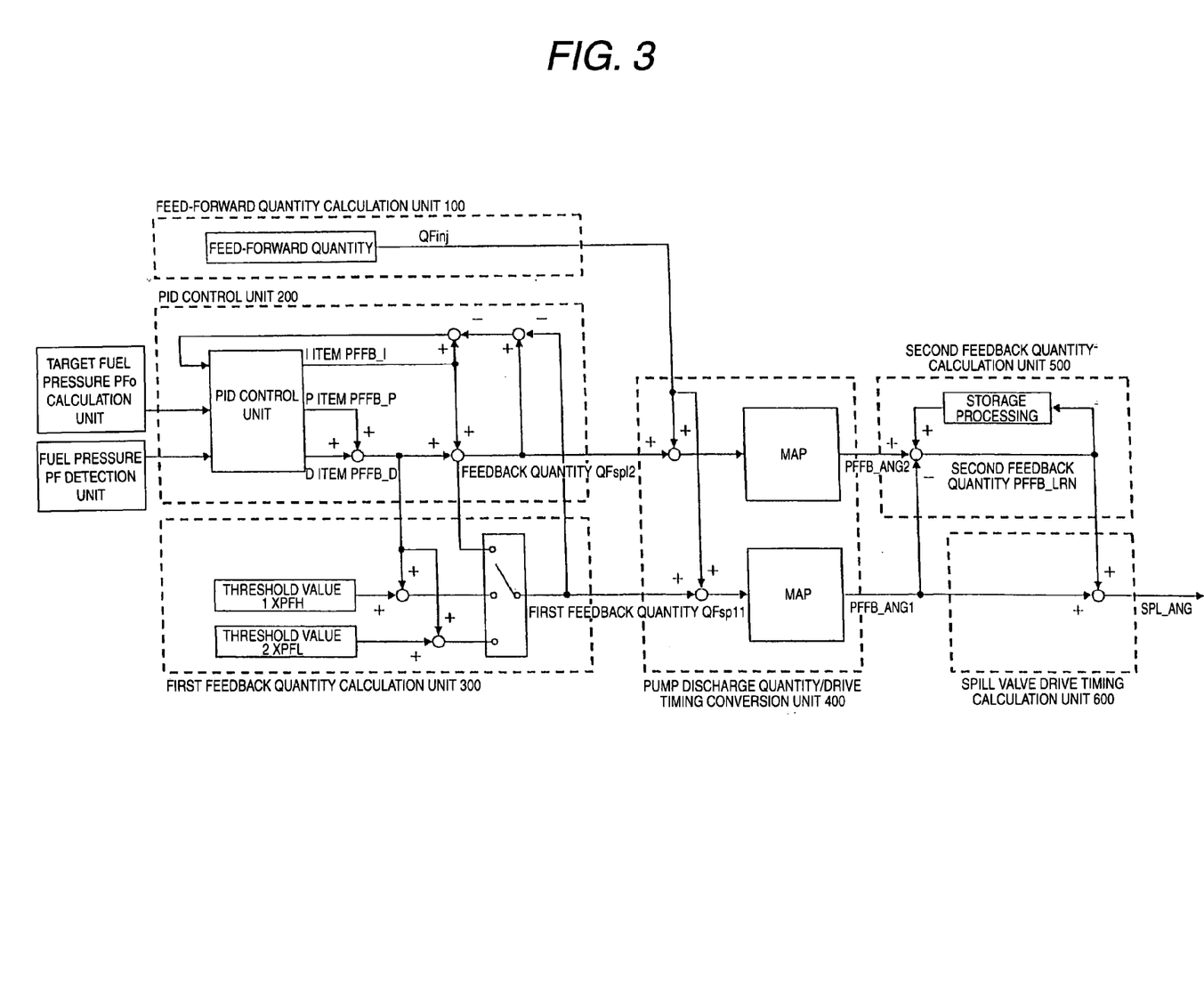
FIG. 3 is a control block diagram of the fuel pressure control apparatus of the cylinder fuel injection type internal combustion engine according to the first embodiment of the invention.

In FIG. 3, the fuel pressure feedback control is conducted by a control quantity computing unit of the ECU 30, i.e., a feedforward quantity computing unit 100, a PID control unit 200, a first feedback quantity computing unit 300, a pump discharge quantity/drive timing converting unit 400, a second feedback quantity computing unit 500, and a spill valve drive timing computing unit 600.

In the feedforward quantity computing unit 100, the same quantity of fuel as the quantity of fuel supplied from the fuel injection valve to each cylinder is set as a feedforward quantity QFinj, and in the PID control unit 200, a feedback quantity Qfspl2 is calculated on the basis of the target fuel pressure PFo and the fuel pressure PF.

Of the feedback quantity GFspl2, a first feedback quantity QFspl1 that is stored in correspondence to the fuel pressure feed quantity of the high-pressure fuel pump is calculated by the first feedback quantity computing unit 300.

The pump discharge quantity/drive timing converting unit 400 adds a feedforward quantity to the calculated feedback quantity QFspl2 and first feedback quantity QFspl1, and converts the quantity corresponding to the target fuel pressure feed quantity of the high-pressure fuel pump to a quantity corresponding to the drive timing of the spill valve using a MAP stored in advance in the ECU 30.

Next, the second feedback quantity computing unit 500 calculates a second feedback quantity PFFB_LRN stored in correspondence to the spill valve drive timing of a feedback quantity PFFB_ANG2 converted to a quantity corresponding to the drive timing of the spill valve. Finally, the spill valve drive timing computing unit 600 adds together a first feedback quantity PFFB_ANG1 converted to a quantity corresponding to the drive timing of the spill valve and the second feedback quantity PFFB_LRN to calculate a spill valve drive timing SPL_ANG.

The processing of the computing units in FIG. 3 (the PID control unit 200, the first feedback quantity computing unit 300, the pump discharge quantity/drive timing converting unit 400, the second feedback quantity computing unit 500, and the spill valve drive timing computing unit 600) will be described in detail below with reference to the flow chart of FIG. 4.

First, in step S401, the fuel pressure PF is detected by the fuel pressure sensor 19.

Next, in steps S402 to S407, PID control is conducted which conducts a proportional (P), integral (I), and differential (D) operation in order to cause the fuel pressure PF to match the target fuel pressure PFo (PID control unit 200 in FIG. 3).

Namely, in step S402, a proportional term PFFB_P is calculated by the following expression.

$$PFFB\_P = Kp \times (PFo - PF) \qquad (1)$$

Here, Kp represents a proportionality constant.

Next, in step S403, it is determined whether or not the fuel pressure PF detected in step S401 is greater than the target fuel pressure PFo.

Here, when the fuel pressure PF is larger than the target fuel pressure PFo (i.e., YES), an integral term PFFB_I is calculated by the following expression in step S404.

$$PFFB\_I = PFFB\_I[i-1] - Ki \times (QFspl2 - QFspl1) \qquad (2)$$

Here, PFFB_I[i−1] represents the value of PFFB_I prior to this calculation, and Ki represents an integral constant.

When the fuel pressure PF is not greater than the target fuel pressure PFo I in step S403 (i.e., NO), the integral term PFFB_I is calculated by the following expression in step S405.

$$PFFB\_I = PFFB\_I[i-1] + Ki \times (QFspl2 - QFspl1) \qquad (3)$$

Here, the reason (QFspl2−QFspl1) is subtracted is because (QFspl2−QFspl1) is finally learned as the second feedback quantity.

Next, a differential term PFFB_D is calculated by the following expression in step S406.

$$PFFB\_D = Kd \times (PF[i] - PF[i-1]) \qquad (4)$$

Here, PF[i] represents the fuel pressure PF detected in step S401, and PF[i−1] represents the fuel pressure before being detected in step S401. Kd represents a differential constant.

The PID control described above is only an example, and it is no problem if the proportionality constant Kp, the integral constant Ki and the differential constant Kd are made variable in response to the running condition.

Also, it is no problem if another technique of common PID control, where the integral term PFFB_I is calculated by the following expression, is used.

$$PFFB\_I = Ki \times (PFo - PF) \qquad (5)$$

Moreover, the PID control described above conducted a proportional, integral and differential operation, but in the present invention, the PID control may also conduct only a proportional and integral operation. Namely, it suffices as long as the PID control conducts at least the integral operation.

In step S407, the target discharge quantity QFspl2 of the high-pressure fuel pump is calculated by the following expression.

$$QFspl2 = PFFB\_P + PFFB\_I + PFFB\_D \qquad (6)$$

Next, in steps S408 to S412, the first feedback quantity QFspl1 is calculated (the first feedback quantity computing unit 300 in FIG. 3).

Namely, in step S408, it is determined whether or not the integral term PFFB_I is larger than a later-described expression (A). Here, when the integral term PFFB_I is larger than the expression (A) (i.e., YES), the target discharge quantity QFspl1 excluding a quantity equal to or greater than a threshold value 1XPFH is calculated by the following expression in step S409.

$$QFspl1 = PFFB\_P + XPFH + PFFB\_D \quad (7)$$

When the integral term PFFB_I is not larger than the expression (A) (i.e., NO) in step S408, it is determined in step S410 whether the integral term PFFB_I is smaller than a later-described expression (B). Here, when the integral term PFFB_I is smaller than the expression (B) (i.e., YES), the target discharge quantity QFspl1 excluding a quantity equal to or less than a threshold value 2XPFL is calculated by the following expression in step S411.

$$QFspl1 = PFFB\_P + XPFL + PFFB\_D \quad (8)$$

When the integral term PFFB_I is smaller than the expression (B) in step S410 (i.e., NO), the target discharge quantity QFspl1 is calculated by the following expression in step S412.

$$QFspl1 = PFFB\_P + PFFB\_I + PFFB\_D \quad (9)$$

Here, the target discharge quantity QFspl1 calculated in step S412 is the same value as the target discharge quantity QFspl2 calculated in step S407.

The aforementioned expression (A) and expression (B) are as follows.

$$\text{Threshold Value } 1XPFH + XPF\_LRN \quad (A)$$

$$\text{Threshold Value } 2XPFL - XPF\_LRN \quad (B)$$

Here, for the threshold value 1XPFH and the threshold value 2XPFL, values are set which correspond to fluctuations and variations stemming from the discharge quantity of the fuel pump, such as fluctuations in the fuel injection quantity due to changes over time in the discharge efficiency of the fuel pump, differences in the airframe of the fuel pump, or differences in the capacity of the fuel pipe system.

Also, for XPF_LRN, a predetermined quantity converted to the second feedback quantity of the first feedback quantity is set. However, when XPF_LRN is converted to the second feedback quantity corresponding to the spill valve drive timing, it is preferable for XPF_LRN to be a value equal to or greater than the dead band for driving the spill valve (e.g., the value after being converted to the second feedback quantity is equal to or greater than 1 deg CA).

Next, in steps S413 to S414 (pump discharge quantity/drive timing converting unit 400), the spill valve drive timing necessary for achieving the target discharge quantity is calculated.

In step S413, the spill valve drive timing QFFB_ANG1 necessary for the high-pressure fuel pump to discharge the target discharge quantity in which the first feedback quantity QFspl1 and the feedforward quantity QFinj are added is calculated by referencing the MAP stored in advance in the ECU 30.

Here, the MAP may be referenced by using, as an argument, the target discharge quantity or the running condition such as the rotational speed Ne of the internal combustion engine or the target fuel pressure PFo. Namely, QFFB_ANG1 may be determined by the target discharge quantity or the running condition such as the rotational speed Ne of the internal combustion engine or the target fuel pressure PFo. The feedforward quantity QFinj is a value corresponding to fuel of the same quantity as the fuel supply from the injector to each cylinder.

In step S414, the spill valve drive timing QFFB_ANG2 necessary for the high-pressure fuel pump to discharge the target discharge quantity in which the feedback quantity QFspl2 and the feedforward quantity QFinj are added is calculated by referencing the MAP stored in advance in the ECU 30. Here, the MAP is the same as the MAP used in step S413.

Next, in step S415 (second feedback quantity computing unit 500), a value in which the target discharge quantity QFspl1 is subtracted from the target discharge quantity QFspl2 is learned by the following equation as the second feedback quantity PFFB_LRN.

$$PFFB\_LRN = PFFB\_LRN[i-1] + (PFFB\_ANG2 - PFFB\_ANG1) \quad (10)$$

Here, PFFB_LRN[i−1] is the value prior to calculating the second feedback quantity PFFB_LRN.

As shown in FIG. 2, the second feedback quantity PFFB_LRN is stored in a battery backup memory 40 that can always store/retain by electrical power supplied from a battery 39, even when the power supply of the ECU 30 controlling the internal combustion engine is OFF.

In step S416 (spill valve drive timing computing unit 600), the spill valve drive timing SPL_ANG necessary for the high-pressure fuel pump to finally discharge only the target discharge quantity QFspl2 is calculated by the following expression.

$$SPL\_ANG = PFFB\_ANG1 + PFFB\_LRN \quad (11)$$

Figure 4:
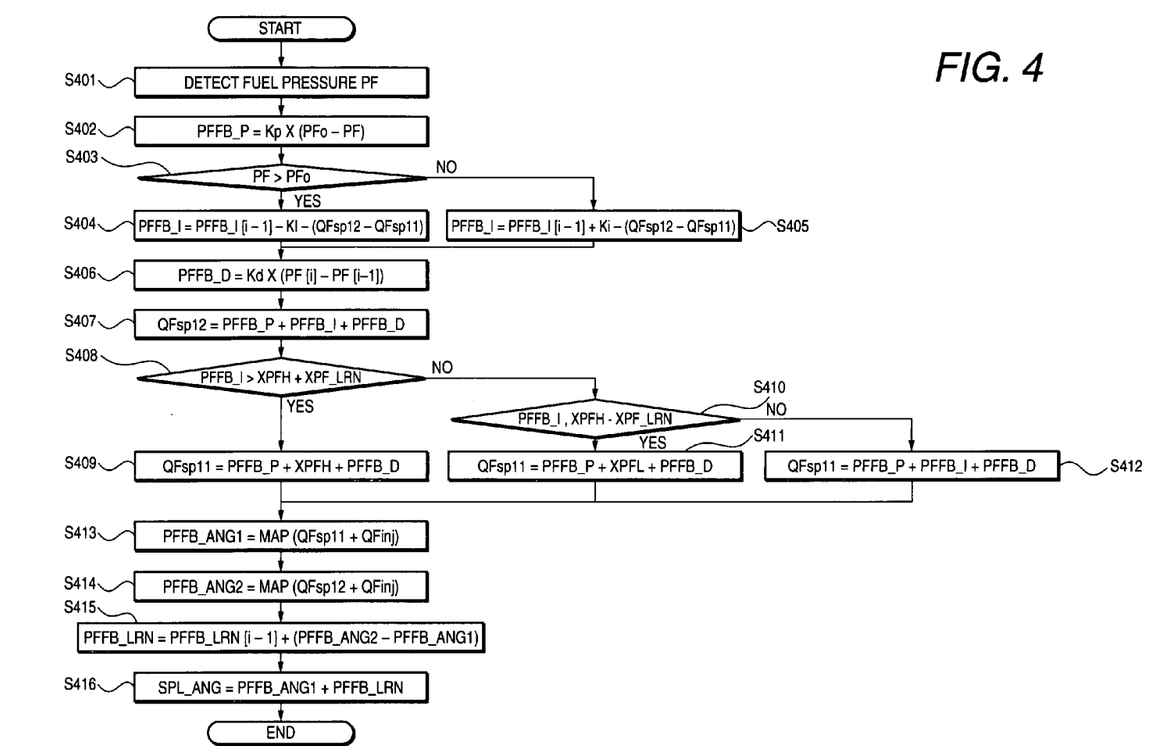
FIG. 4 is a flow chart showing an operation according to the first embodiment of the invention.

Here, a specific operating example of the first feedback quantity and the second feedback quantity in the fuel pressure control apparatus of the cylinder fuel injection type internal combustion engine configured as shown in FIGS. 3 and 4 will be described with reference to the operation description diagram of FIG. 5.

Figure 5:
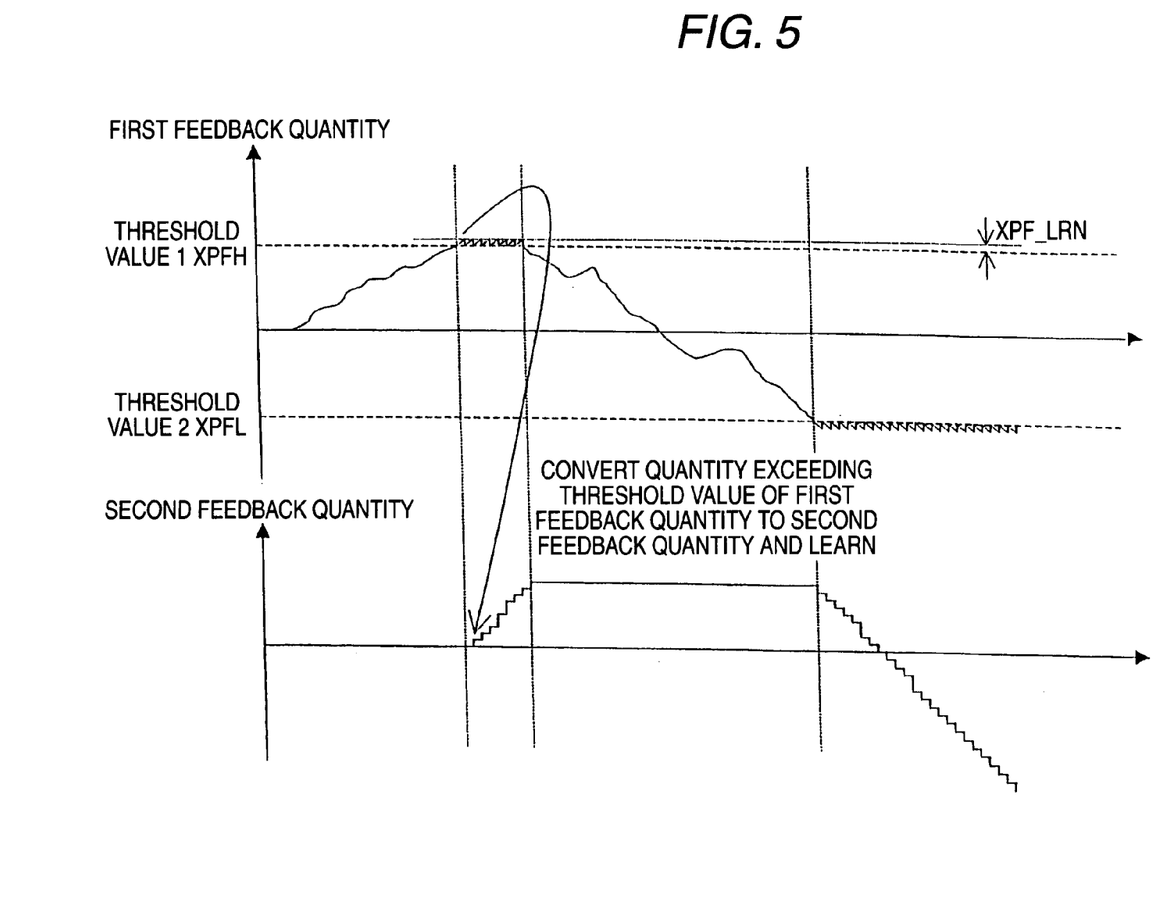
FIG. 5 is an operation description diagram showing the operation according to the first embodiment of the invention.

Namely, in FIG. 5, the quantity equal to or greater than the threshold value 1XPFH is converted to the second feedback quantity when the first feedback quantity is greater than the value calculated by the expression (A), or the quantity equal to or less than the threshold value 2XPFL is converted to the second feedback quantity when the first feedback quantity is smaller than the value calculated in expression (B).

Next, an operating method, different from that of FIG. 5, of the first feedback quantity and the second feedback quantity in the fuel pressure control apparatus of the cylinder fuel injection type internal combustion engine configured as shown in FIG. 3 will be described with reference to the operation description diagram of FIG. 6.

Figure 6:
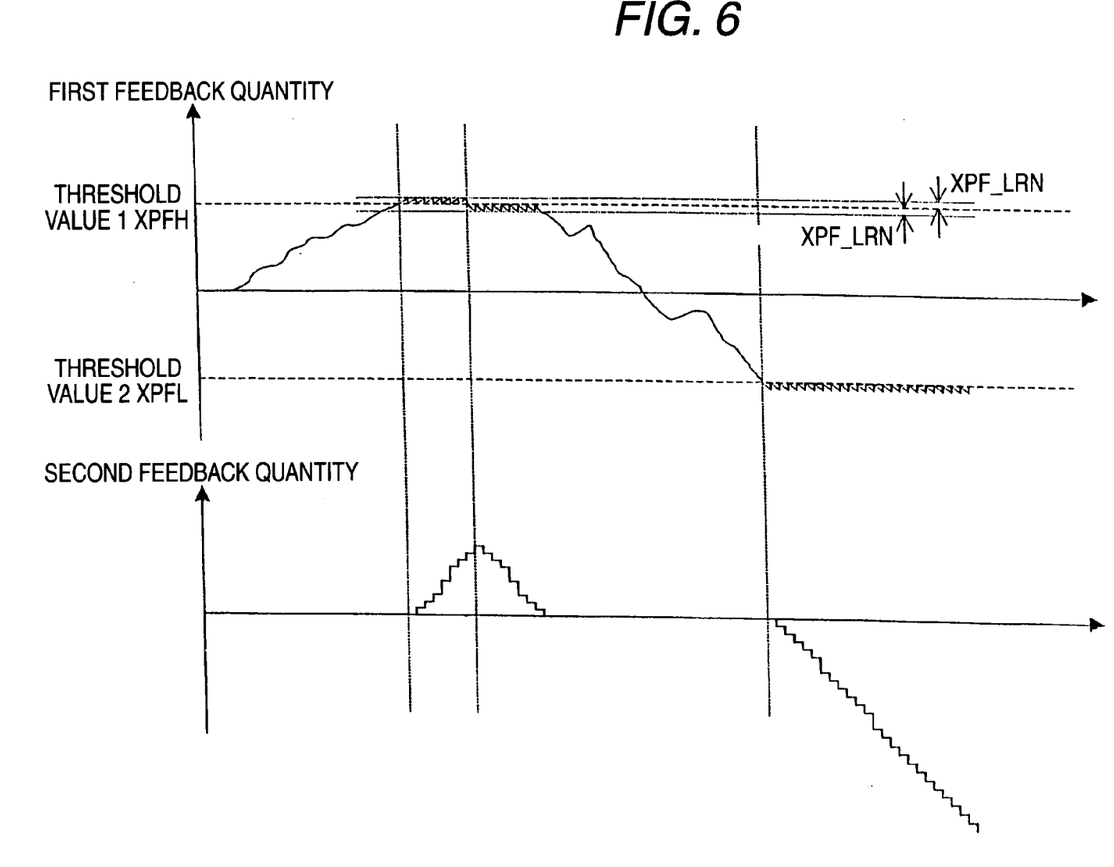
FIG. 6 is an operation description diagram showing the operation according to the first embodiment of the invention.

In FIG. 6, first, the quantity equal to or greater than the threshold value 1XPFH is converted to the second feedback quantity when the first feedback quantity is greater than the value calculated by the expression (A).

Next, when the first feedback quantity is smaller than the value calculated by a later-described expression (C) and when the second feedback quantity is positive, the second feedback quantity is returned to the first feedback quantity by the quantity that the second feedback quantity is smaller than the value calculated in the expression (C).

Thereafter, the condition continues in which the first feedback quantity is reduced, and when the second feedback quantity reaches 0, it is corrected by only the first feedback quantity.

Namely, when the feedback quantity calculated by the control quantity computing unit of the ECU 30 is within a predetermined range, only the first feedback quantity is used for the control quantity, and when the feedback quantity is outside of the predetermined range, both the first feedback quantity and the second feedback quantity are used.

Here, the aforementioned expression (C) is as follows.

$$\text{Threshold Value } 1XPFH - XPF\_LRN \quad (C)$$

It will be noted that FIGS. 5 and 6 show the method where the spill valve 33 is closed and the high-pressure fuel is discharged from the fuel pressure control means 18 to the fuel rail 12 during the first half of the fuel discharge period (first half discharge, latter half relief).

As described above, according to the first embodiment of the invention, the feedback quantity calculated by the control means (ECU 30) is learned by (1) the first feedback quantity feeding back a fuel pressure feed quantity of the fuel pump with respect to fluctuations and variations stemming from the discharge quantity of the fuel pump such as fluctuations in the fuel injection quantity due to changes over time in the discharge efficiency of the fuel pump, differences in the airframe of the fuel pump, or differences in the capacity of the fuel pipe system, and by (2) the second feedback quantity feeding back the timing at which the spill valve opens or closes the fuel relief path with respect to fluctuations and variations affected the drive timing of the spill valve such as the output tolerance of the cam angle rotary sensor, the manufacturing tolerance of the plate engine, and the installation error between the fuel pump and the pump drive cam with respect to the rotary signal. Thus, fluctuations and variations stemming from the discharge quantity of the high-pressure fuel pump can be suppressed, and fluctuations and variations affecting the timing at which the spill valve opens or closes the fuel relief path can also be suppressed. As a result, the fuel pressure inside the accumulation chamber can be accurately controlled to a predetermined pressure, and deterioration of the runability of the automobile and the exhaust gas resulting from deterioration of the combustion of the internal combustion engine can be prevented.

Also, by converting the feedback quantity to the second feedback quantity by a predetermined quantity of the first feedback quantity when the first feedback quantity is outside of the predetermined range, fluctuations and variations stemming from the discharge quantity of the fuel pump and fluctuations and variations that affect the drive timing of the spill valve can be clearly differentiated and learned. As a result, the fuel pressure inside the accumulation chamber can be accurately controlled to a predetermined pressure, and deterioration of the runability of the automobile and the exhaust gas resulting from deterioration of the combustion of the internal combustion engine can be prevented.

Also, by making the first feedback quantity and the second feedback quantity into the quantity corresponding to at least the integral term of the original feedback quantity calculated by the control means, and in particular the integral term of PID control, the fuel pressure inside the accumulation chamber can be accurately controlled to a predetermined pressure without making the control means complicated, and deterioration of the runability of the automobile and the exhaust gas resulting from deterioration of the combustion of the internal combustion engine can be prevented.

Also, by storing the second feedback quantity in the battery backup memory, transient fluctuations and variations can be corrected with the first feedback quantity, and routine fluctuations and variations such as initial variations can be corrected with the second feedback quantity. As a result, the fuel pressure inside the accumulation chamber can be accurately controlled to a predetermined pressure, and deterioration of the runability of the automobile and the exhaust gas resulting from deterioration of the combustion of the internal combustion engine can be prevented.

SECOND EMBODIMENT

In the first embodiment, reference was made to the predetermined range (predetermined range for determining that the first feedback quantity is outside of the predetermined range) set by the expressions (A) and (B), but the predetermined range may also be changed on the basis of at least one of the engine rotation speed, the discharge quantity of the high-pressure fuel pump, and the fuel pressure.

The operation according to a second embodiment of the invention will be described below with reference to FIGS. 7 to 9.

Figure 7:
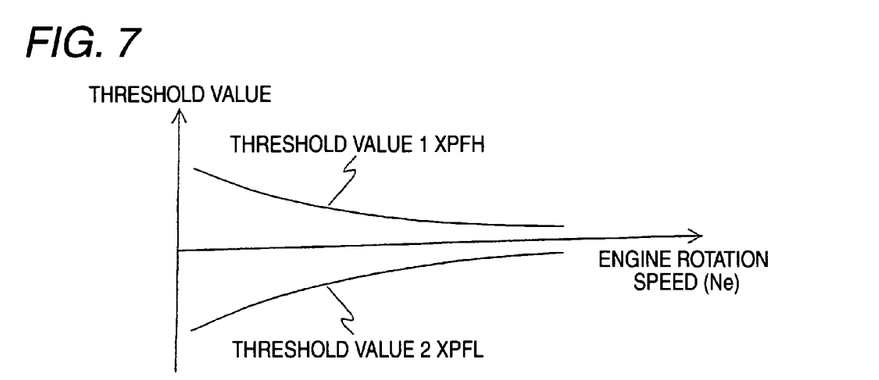
FIG. 7 is a diagram showing an example of the setting of a threshold value with respect to engine rotation speed according to a second embodiment of the invention.

First, when the predetermined range is changed on the basis of the engine rotation speed, the threshold value 1XPFH and the threshold value 2XPFL are set as shown in FIG. 7, for example.

Namely, because fluctuations and variations such as the initial tolerance and deterioration tolerance of the fuel pump discharge quantity have a tendency to have as great an affect as low rotation, the range set by the threshold value 1XPFH and the threshold value 2XPFL is set to become as wide as low rotation.

Figure 8:
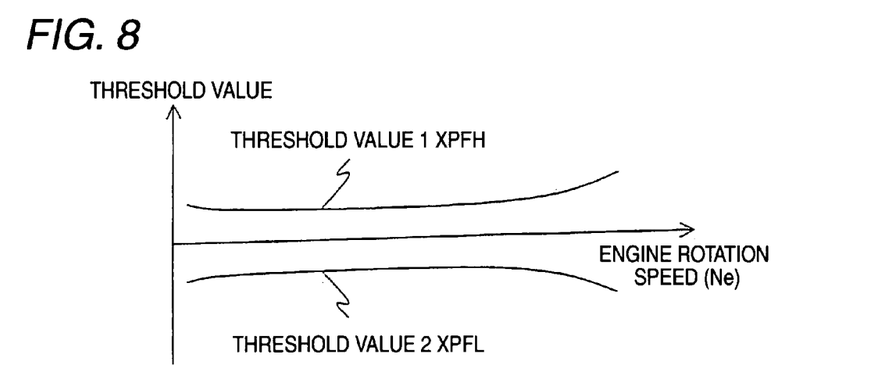
FIG. 8 is a diagram showing an example of the setting of a threshold value with respect to engine rotation speed according to a second embodiment of the invention.
Figure 12:
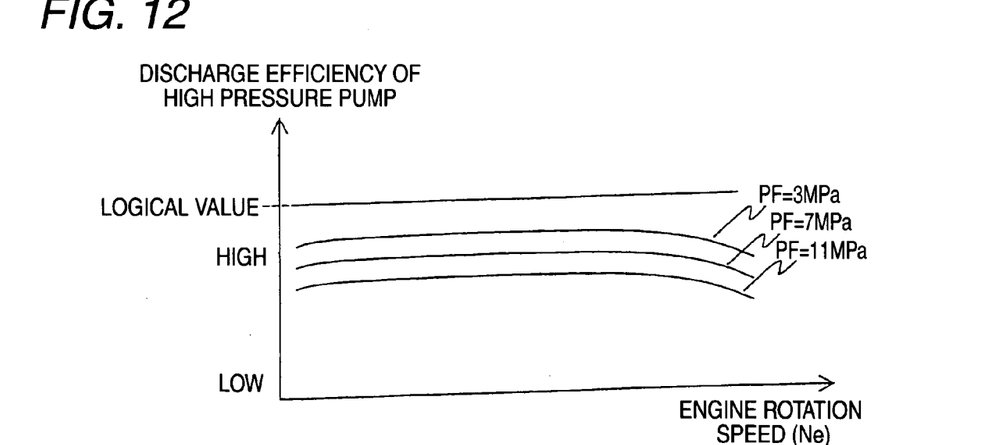
FIG. 12 is a diagram showing the relationship between the engine rotation speed, fuel pressure, and the high-pressure pump discharge efficiency according to the second embodiment of the invention.

The threshold value 1XPFH and the threshold value 2XPFL may also be set as shown in FIG. 8, for example. Namely, the discharge efficiency of the high-pressure pump with respect to the engine rotation speed is usually as shown in FIG. 12. In FIG. 12, the discharge efficiency of the high-pressure pump becomes low when the engine rotation speed is at a high rotation or a low rotation. Because the lowered portion of the discharge quantity resulting from the discharge efficiency becoming lower is corrected with the first feedback quantity, as shown in FIG. 8, the range set by the threshold value 1XPFH and the threshold value 2XPFL is set to become as wide as high rotation and low rotation.

Figure 9:
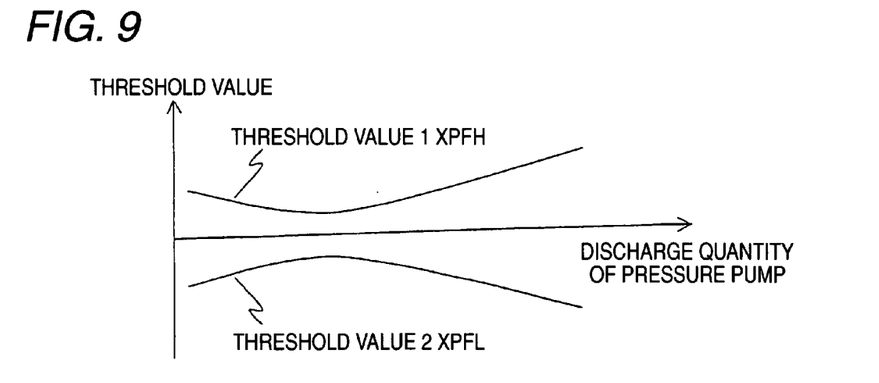
FIG. 9 is a diagram showing an example of the setting of a threshold value with respect to the discharge quantity of a high-pressure pump according to the second embodiment of the invention.

Next, when the predetermined range is changed on the basis of the discharge quantity of the high-pressure pump, the threshold value 1XPFH and the threshold value 2XPFL are set as shown in FIG. 9, for example.

Namely, the discharge quantity of the high-pressure pump with respect to the spill valve drive timing is usually as shown in FIG. 11. Here, FIG. 11 shows the method where the spill valve 33 is closed and the high-pressure fuel is discharged from the fuel pressure control means 18 to the fuel rail 12 during the first half of the fuel discharge period (first half discharge, latter half relief). In FIG. 11, when the high-pressure pump discharge quantity is large or small, the change quantity in the high-pressure pump discharge quantity is small with respect to the change quantity in the spill valve drive timing. Namely, when fluctuations and variations stemming from the discharge quantity arise, their affect (fluctuations and variations) on the spill valve drive timing becomes larger. For this reason, the range set by the threshold value 1XPFH and the threshold value 2XPFL is set to become wider as the discharge quantity of the high pressure pump becomes larger or smaller.

Figure 10:
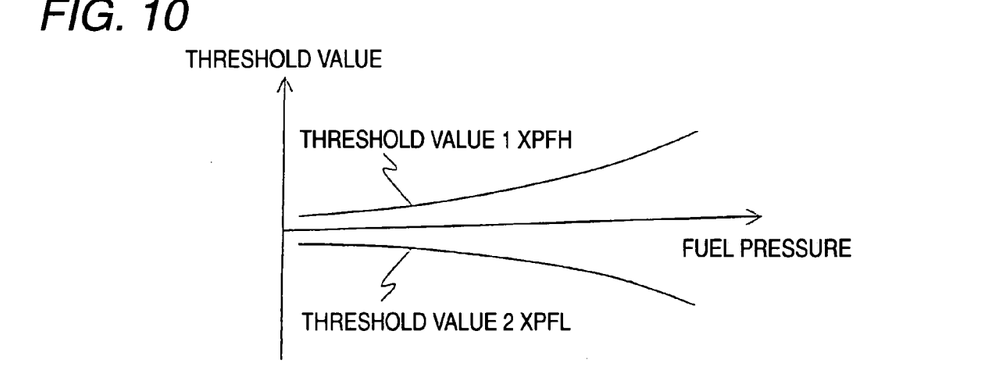
FIG. 10 is a diagram showing an example of the setting of a threshold value with respect to fuel pressure according to the second embodiment of the invention.

Next, when the predetermined range is changed on the basis of the fuel pressure, the threshold value 1XPFH and the threshold value 2XPFL are set as shown in FIG. 10, for example.

Namely, the discharge efficiency of the high-pressure pump with respect to the fuel pressure PF is usually as shown in FIG. 12.

In FIG. 12, the discharge efficiency becomes lower as the fuel pressure PF becomes higher. Because the lowered portion of the discharge quantity resulting from the discharge efficiency becoming lower is corrected by the first feedback quantity, as shown in FIG. 10, the range set by the threshold value 1XPFH and the threshold value 2XPFL is set to become wider as the fuel pressure PF becomes higher.

Here, the threshold value 1XPFH and the threshold value 2XPFL may be referenced using FIGS. 7 to 10 as respective tables, or they may be referenced using FIGS. 7 to 10 as a collective map.

Also, when the predetermined range is set on the basis of two or more of the engine rotation speed, the discharge pressure of the high-pressure pump, and the fuel pressure, it may be selected from the maximum value, the minimum value, or an intermediate value between the maximum value and the minimum vale of the predetermined range determined by the above conditions. Namely, the maximum value may be selected in order to suppress the affects of fluctuations and variations stemming from the discharge quantity of the high-pressure pump, the minimum value may be selected in order to suppress fluctuations and variations stemming from the drive timing of the spill valve, or a value may be weighted therebetween and set.

In this manner, according to the second embodiment of the invention, by changing the predetermined range on the basis of at least one of the engine rotation speed, the discharge quantity of the high-pressure pump, and the fuel pressure, determination between the first feedback quantity and the second feedback quantity in response to the running condition becomes possible. As a result, the fuel pressure inside the accumulation chamber can be accurately controlled to a predetermined pressure, and deterioration of the runability of the automobile and the exhaust gas resulting from deterioration of the combustion of the internal combustion engine can be prevented.

THIRD EMBODIMENT

In the first and second embodiments, the fuel system may be determined to be abnormal when the second feedback quantity deviates from a pre-assumed ordinarily conceivable predetermined range.

The operation according to a third embodiment of the invention will be described below with reference to FIGS. 1 to 5 and FIG. 13.

Figure 13:
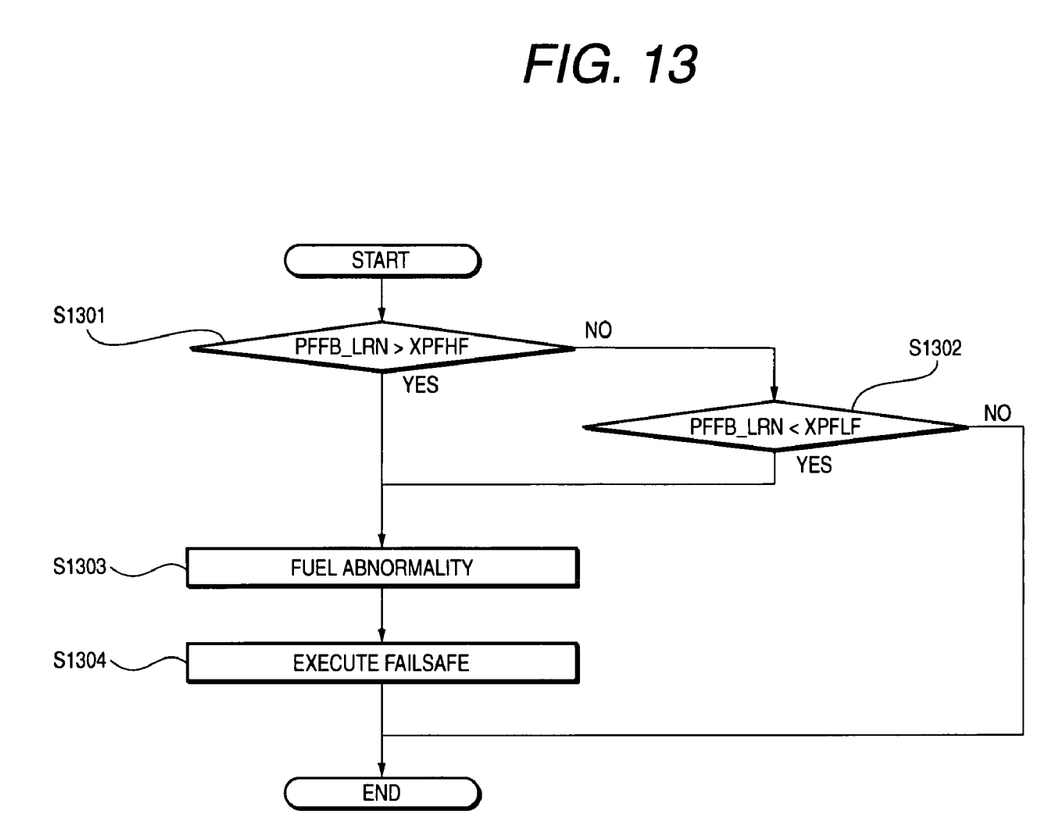
FIG. 13 is a flow chart showing an operation according to a third embodiment of the invention.

In FIG. 13, first, it is determined in step S1301 whether the second feedback quantity is great than a threshold 3XPFHF. Here, when the second feedback quantity is greater than the threshold 3XPFHF (i.e., YES), it is determined in step S1303 that there is a failure in the fuel system, and failsafe is executed in step S1304.

When the second feedback quantity is not greater than the threshold 3XPFHF in step S1301 (i.e., NO), it is determined in step S1302 whether the second feedback quantity is smaller than a threshold 4XPFLF. Here, when the second feedback quantity is smaller than the threshold 4XPFLF (i.e., YES), it is determined in step S1303 that there is a failure in the fuel system, and failsafe is executed in step S1304. When the second feedback quantity is not smaller than the threshold 4XPFLF in step S1302, the processing ends without determining that there is a failure.

Next, the behavior of the second feedback quantity in the fuel pressure control apparatus of the cylinder fuel injection type internal combustion engine configured as described above will be described with reference to FIG. 14.

Figure 14:
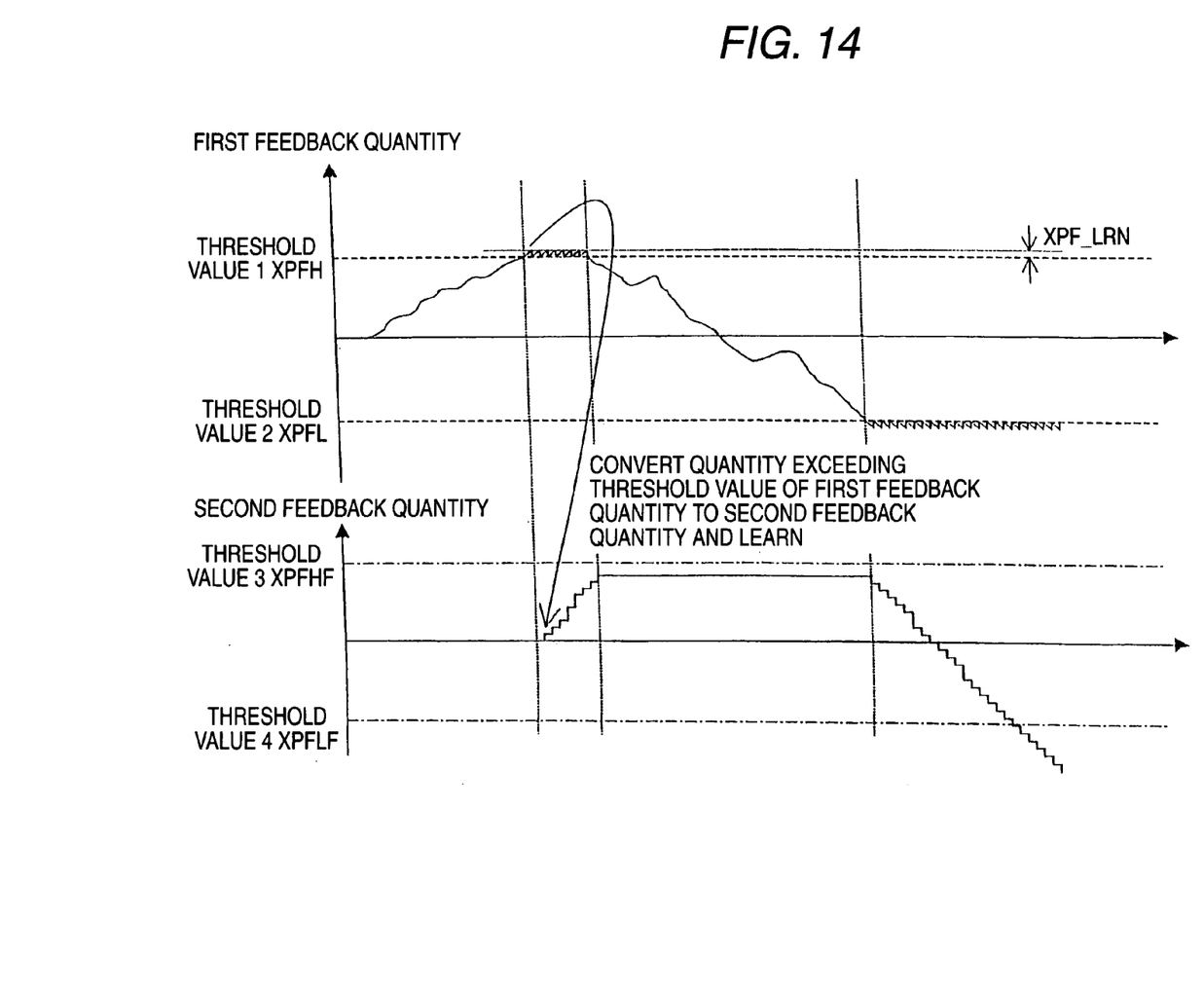
FIG. 14 is an operation description diagram showing the operation according to the third embodiment of the invention.

Namely, in FIG. 14, when the first feedback quantity is greater than the value calculated by the expression (A), a quantity equal to or greater than the threshold 1XPFH is converted to the second feedback quantity, and when the first feedback quantity is smaller than the value calculated by the expression (B), a quantity equal to or less than the threshold 2XPFL is converted to the second feedback.

Here, in FIG. 14, it is determined that there is a failure in the fuel system at the place where the second feedback quantity is smaller than the threshold value 4XPFLF, and failsafe is executed during this period.

It will be noted that FIG. 14 shows the method where the spill valve 33 is closed and the high-pressure fuel is discharged from the fuel pressure control means 18 to the fuel rail 12 during the first half of the fuel discharge period (first half discharge, latter half relief).

In this manner, by determining that the fuel system is abnormal and executing the failsafe when the second feedback quantity deviates from the pre-assumed ordinarily conceivable predetermined range, the fuel pressure can be prevented from becoming abnormal due to miscorrection. Thus, deterioration of the runability of the automobile and the exhaust gas resulting from deterioration of the combustion of the internal combustion engine can be prevented.

The high-pressure fuel pump described in the first to third embodiments was one where the intake path and the relief path of the fuel were separately disposed, but the present invention is not limited to this and can also be applied to a high-pressure fuel pump where the intake path and the relief path of the fuel are integrally disposed so that the spill valve is opened/closed by a plunger rod.

Also, the present invention is not limited to the cylinder fuel injection type spark ignition type gasoline engine described in the first to third embodiments, and can also be applied to various internal combustion engines, such as a compression ignition type diesel engine.

What is claimed is:

1. An internal combustion engine fuel pressure control apparatus comprising:
    an accumulation chamber that accumulates fuel at a high pressure;
    fuel pressure control means including a high-pressure fuel pump that intakes fuel and pressure-feeds the fuel to the accumulation chamber and a spill valve that opens/closes a fuel relief path that communicates a booster chamber of the high-pressure fuel pump and a low pressure side;
    an injector that injects/supplies the high-pressure fuel accumulated in the accumulation chamber to cylinders of the internal combustion engine;
    a fuel pressure sensor that detects, as fuel pressure, the pressure of the fuel supplied to the injector; and
    control means that calculates a control quantity of the fuel pressure control means on the basis of fuel pressure information detected by the fuel pressure sensor and which variably sets the pressure of the fuel supplied to the injector by driving/controlling said fuel pressure control means,
    wherein the control quantity calculated by the control means is configured by a first feedback quantity that feeds back the fuel quantity that the high-pressure fuel pump pressure-feeds to the accumulation chamber and a second feedback quantity that feeds back the timing at which the spill valve opens or closes the fuel relief path.

2. The internal combustion engine fuel pressure control apparatus of claim 1, wherein the control quantity calculated by the control means comprises only the first feedback quantity when the control quantity is within a predetermined range and comprises both the first feedback quantity and the second feedback quantity when the control quantity is outside the predetermined range.

3. The internal combustion engine fuel pressure control apparatus of claim 1, wherein when the first feedback quantity is outside a predetermined range, it is converted to the second feedback quantity by only a predetermined quantity of the first feedback quantity.

4. The internal combustion engine fuel pressure control apparatus of claim 2, wherein the predetermined range is changed on the basis of at least one of the group consisting of the engine rotation speed, the discharge quantity of the high-pressure pump, and the fuel pressure.

5. The internal combustion engine fuel pressure control apparatus of claim 3, wherein the predetermined range is changed on the basis of at least one of the group consisting of the engine rotation speed, the discharge quantity of the high-pressure pump, and the fuel pressure.

6. The internal combustion engine fuel pressure control apparatus of claim 1, wherein the control means includes at least an integral term of PID control having a proportional term (P), an integral term (I) and a differential term (D), and the first feedback quantity and the second feedback quantity are quantities corresponding to the integral term.

7. The internal combustion engine fuel pressure control apparatus of claim 1, wherein the control means includes a battery backup memory that can always store/retain by electrical power supplied by a battery, and at least the second feedback quantity is stored in the battery backup memory.

8. The internal combustion engine fuel pressure control apparatus of claim 1, wherein the control means includes abnormality determining means that determines that the fuel system is abnormal when the second feedback quantity deviates from a pre-assumed predetermined range.

* * * * *